(12) United States Patent
Gore et al.

(10) Patent No.: US 12,273,581 B2
(45) Date of Patent: *Apr. 8, 2025

(54) TESTING RENDERING OF SCREEN OBJECTS

(71) Applicant: Nagravision Sàrl, Cheseaux-sur-Lausanne (CH)

(72) Inventors: Douglas Gore, Pontyclun (GB); Ping Zou, Cwmbran (GB)

(73) Assignee: Nagravision Sàrl, Cheseaux-sur-Lausanne (CH)

(*) Notice: Subject to any disclaimer, the term of this patent is extended or adjusted under 35 U.S.C. 154(b) by 82 days.

This patent is subject to a terminal disclaimer.

(21) Appl. No.: 18/193,947

(22) Filed: Mar. 31, 2023

(65) Prior Publication Data

US 2023/0353814 A1 Nov. 2, 2023

Related U.S. Application Data

(63) Continuation of application No. 17/267,212, filed as application No. PCT/EP2019/071495 on Aug. 9, 2019, now Pat. No. 11,647,249.

(30) Foreign Application Priority Data

Aug. 10, 2018 (EP) .................................... 18188576

(51) Int. Cl.
*H04N 21/43* (2011.01)
*H04N 17/00* (2006.01)
(Continued)

(52) U.S. Cl.
CPC ....... *H04N 21/43074* (2020.08); *H04N 17/04* (2013.01); *H04N 21/2187* (2013.01); *H04N 21/84* (2013.01); *H04N 2017/008* (2013.01)

(58) Field of Classification Search
CPC .... H04N 17/04; H04N 21/2187; H04N 21/84; H04N 2017/008
See application file for complete search history.

(56) References Cited

U.S. PATENT DOCUMENTS 9,471,990 B1 10/2016 Kumar
11,647,249 B2 5/2023 Gore et al.
(Continued)

FOREIGN PATENT DOCUMENTS

EP 3609189 B1 10/2021
KR 20170047547 A 5/2017
WO WO-2020030810 A1 2/2020

OTHER PUBLICATIONS

"U.S. Appl. No. 17/267,212, Decision on Pre-Appeal Brief Request mailed Dec. 2, 2022" 2 pgs.
(Continued)

*Primary Examiner* — Michael R Telan
(74) *Attorney, Agent, or Firm* — Maier & Maier, PLLC

(57) ABSTRACT

The present disclosure relates to methods and devices for testing video data being rendered at or using a media device. A plurality of video frames to be rendered is received, each frame comprising one or more primary screen objects and at least one further screen object. The received frames are rendered at or using the media device wherein the at least one further screen object is superimposed on the one or more primary screen objects of a given frame during rendering. The rendered frames are provided to a data model. Extracted metadata indicating the presence or absence of further screen objects in the rendered video frames is the output of the data model. The data model is also provided with original metadata associated with the video frames prior to rendering. The rendering of each further screen object is then tested based on the original metadata and extracted metadata relating to a given video frame. The disclosure also
(Continued)

extends to associated methods and devices for generating training data for testing rendering of video frame and training a data model using the training data.

20 Claims, 6 Drawing Sheets

(51) Int. Cl.
*H04N 17/04* (2006.01)
*H04N 21/2187* (2011.01)
*H04N 21/84* (2011.01)

(56) References Cited

U.S. PATENT DOCUMENTS

| | | | |
|---|---|---|---|
| 2012/0143606 | A1 | 6/2012 | Pham |
| 2012/0206567 | A1* | 8/2012 | Zafarifar ............... H04N 7/025 |
| | | | 348/E13.001 |
| 2015/0271442 | A1* | 9/2015 | Cronin ............. H04N 21/43072 |
| | | | 348/464 |
| 2016/0373830 | A1* | 12/2016 | Ramnani ............ H04N 21/4884 |
| 2019/0089951 | A1* | 3/2019 | Jones ................. H04N 21/4884 |
| 2021/0314651 | A1 | 10/2021 | Gore et al. |

OTHER PUBLICATIONS

"U.S. Appl. No. 17/267,212, Final Office Action mailed Aug. 23, 2022", 23 pgs.

"U.S. Appl. No. 17/267,212, Non Final Office Action mailed Mar. 28, 2022", 19 pgs.

"U.S. Appl. No. 17/267,212, Notice of Allowance mailed Jan. 3, 2023", 6 pgs.

"U.S. Appl. No. 17/267,212, Pre-Appeal Brief Request filed Nov. 22, 2022", 5 pgs.

"U.S. Appl. No. 17/267,212, Response filed Jun. 28, 2022 to Non Final Office Action mailed Mar. 28, 2022", 16 pgs.

"European Application Serial No. 18188576.5, Communication Pursuant to Article 94(3) EPC mailed Oct. 1, 2020", 6 pgs.

"European Application Serial No. 18188576.5, Extended European Search Report mailed Nov. 14, 2018", 7 pgs.

"European Application Serial No. 18188576.5, Response filed Jan. 27, 2021 to Communication Pursuant to Article 94(3) EPC mailed Oct. 1, 2020", 15 pgs.

"European Application Serial No. 18188576.5, Response filed Aug. 6, 2020 to Extended European Search Report mailed Nov. 14, 2018", 21 gs.

"International Application Serial No. PCT/EP2019/071495, International Preliminary Report on Patentability mailed Feb. 25, 2021", 12 pages.

"International Application Serial No. PCT/EP2019/071495, International Search Report mailed Aug. 27, 2019", 4 pgs.

"International Application Serial No. PCT/EP2019/071495, Written Opinion mailed Aug. 27, 2019", 13 pgs.

Sabater, Alberto, "Automatic Subtitle Synchronization—Machine Learnings", XP055520600, [Online] Retrieved from the Internet: <URL: https://machinelearnings.co/automatic-subtitle-synchronization-e188a9275617> (Sep. 14, 2017), 8 pgs.

\* cited by examiner

20 SECONDS SUBTITLE EXAMPLE

ORIGINAL SUBTITLE METADATA 1
00:00:02.000 --> 00:00:05.000
FIRST SUBTITLE 2
00:00:10.000 --> 00:00:15.000
SECOND SUBTITLE

204
ORIGINAL SUBTITLE METADATA

EXTRACTED SUBTITLE METADATA

| | |
|---|---|
| 00:00:00.045 | 0 |
| 00:00:01.050 | 0 |
| 00:00:02.046 | 1 |
| 00:00:03.053 | 1 |
| 00:00:04.067 | 1 |
| 00:00:05.023 | 0 |
| 00:00:06.045 | 0 |
| 00:00:07.056 | 0 |
| 00:00:08.050 | 0 |
| 00:00:09.034 | 0 |
| 00:00:10.045 | 0 |
| 00:00:11.034 | 0 |
| 00:00:12.042 | 0 |
| 00:00:13.048 | 1 |
| 00:00:14.046 | 1 |
| 00:00:15.051 | 1 |
| 00:00:16.050 | 1 |
| 00:00:17.047 | 1 |
| 00:00:18.044 | 0 |
| 00:00:19.045 | 0 |

220
DETECTED METADATA

FIG. 3

TESTING RENDERING OF SCREEN OBJECTS

PRIORITY APPLICATIONS

This application is a continuation of U.S. patent application Ser. No. 17/267,212, filed on Feb. 9, 2021, which is a U.S. National Stage filing under 35 U.S.C. § 371 of PCT Patent Application No. PCT/EP2019/071495, filed on Aug. 9, 2019, which claimed priority to European Patent Application No. 18188576.5, filed on Aug. 10, 2018, which applications are herein incorporated by reference in their entireties.

FIELD

The present disclosure relates to methods and devices for testing rendering of one or more screen objects in a video stream

BACKGROUND

Automated testing is part of software development life cycles, which serves to continually ensure that software solutions are maintained in a functionally correct state. However, in areas like digital television (DTV) related development, an existing issue is that testing the correctness of the software or an instruction set is very difficult when the output is visual. Solutions like binary comparison of a visual output against a reference image are very brittle, time consuming to implement, and not suited for dynamic contents, e.g. live video streams. Particularly, existing DTV playback visual quality checks, e.g. subtitle rendering, is being done manually, or by a simple fixed image comparison. The existing processes for checking the quality of subtitle rendering are inefficient, hard to repeat, error prone and not feasible to apply to dynamic contents that are rendered for playback. Furthermore, testing of visual output of a video stream of a live event is difficult to implement and almost impossible to guarantee accuracy when done using existing image comparison techniques such as OCR or manual testing methods. It is also very difficult to continually and consistently test a live visual output using known testing techniques. Accordingly, there is a need for an efficient, automated, scalable and accurate process for testing the rendering, i.e. output playback of dynamic content, i.e. a video stream comprising a plurality of video frames.

BRIEF DESCRIPTION OF THE DRAWINGS

Aspects and embodiments of this disclosure are now described by way of example for the purpose of illustration and with reference to the accompanying drawings, in which:

FIG. 3 shows an example of original or source metadata of video frames prior to rendering, and an example of extracted metadata corresponding to the video frames after rendering, relating to the second aspect.

DETAILED DESCRIPTION

Figure 1:
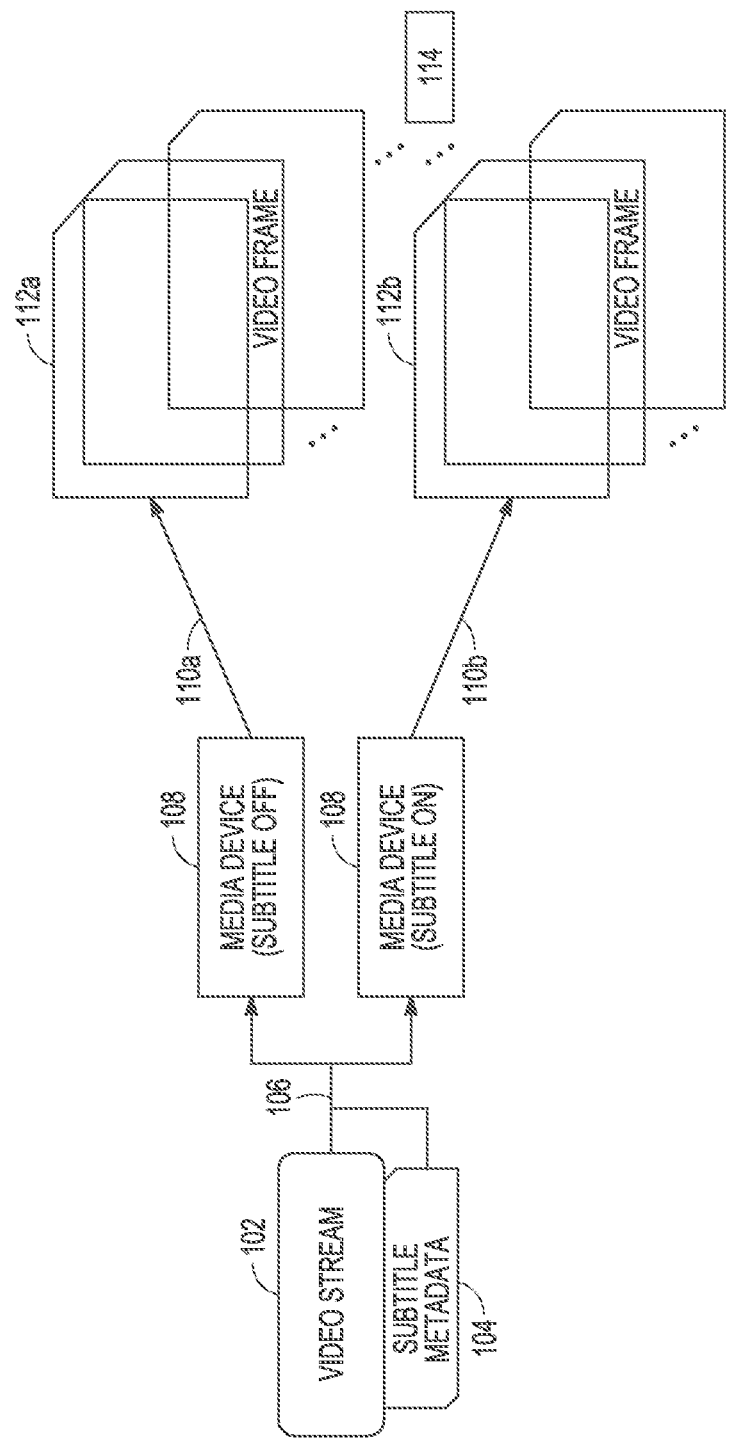
FIG. 1 is a schematic depicting a method of obtaining training data to train a data model to test rendering of one or more video frames, according to a first aspect of the disclosure.

In overview, methods and devices in accordance with the disclosure relate to obtaining computer readable information, such as metadata, from an output video stream, which is then used to test if the output video stream was correctly rendered. Data models are trained to generate metadata from a video/visual output, i.e. a render of a video data of a media device or application, such as a set top box, to capture more information from the visual output for testing, diagnostics, as well as data for an automated quality check. The term rendering is understood to include playback at or using a media device. In some implementations, the media device may include an application or processing module for a player capable of preparing and providing a video output on a display, such as a visual display unit, graphical interface unit associated with the media device. The rendering also includes processing the video stream at media device for projection on a screen that is not directly associated with the media device, i.e. when the media device is a projector.

In a first aspect a method of obtaining training data to train a data model is disclosed. In some implementations, the data model is trained for testing a rendering of one or more video frames at or using a media device. The method of the first aspect comprises obtaining as training data for a data model a set of rendered video frames, the method comprising rendering at a media device, a plurality of video frames of a source video stream, each frame comprising one or more primary screen objects. In some embodiments, the primary screen objects may include dynamic video content comprising images and optical characters that make up a visual scene represented in a video frame. The source video stream further comprises source or original metadata for describing a further screen object to be rendered in at least one of the plurality of video frames, where the further screen object is configured to be superimposed on the one or more primary screen objects of a given frame during rendering. The method comprises rendering each frame of the plurality of frames at least once with the further screen object and at least once without the further screen object. The media device includes a setting allowing or not allowing the further screen object to be rendered. In some embodiments, the primary screen objects may be components that make up a dynamic image in a video frame, for example in-video images of individuals or buildings, vehicles etc. that make up a scene represented in the video frame. Further screen objects in a video frame may include a timed text screen object, which for example represents subtitles, otherwise known as closed captions, for the video frame. Thus, the plurality of video frames is rendered at least once with the subtitles turned on, and at least once with the subtitled turned off. In some implementations, rendering relates to preparing the video frames for video/visual output at or using a media player. For example, this includes preparing the video frames for playback and/or display on a screen or graphical user interface associated with the media device. The method further includes creating a training data set including a set of rendered frames, each frame in the training data set corresponding to one of the plurality of video frames rendered with and without the further screen object, and a corresponding data item for each frame indicating the presence or absence of a further screen object in a given frame It is understood that in some implementations there may be some frames in the plurality of video frames that do not have further screen objects at all and/or some frames which are only rendered with a further screen object. The source metadata includes information to indicate whether a given frame includes a further screen object. In some implementations this may be a time stamp associated with the given video frame.

In some implementations, the data item for a given frame is a descriptive label. The label for example may state if there is a further screen object, i.e. subtitle present or not. In some implementations the label may also state the location of the subtitle, dimensions, the text is etc. In other implementations, the data item may be a flag to state if a subtitle is present or not.

Thus, the training data to be provided to a data model is a set of frames or images, along with a corresponding data item or a flag or label for each.

In some embodiments, the data item obtained may be descriptive data that is provided or applied by an observer, for example by crowd sourcing or other means of data gathering, or provided by an existing database of associated labels, or any other known means. Crowd sourcing for the data items may typically be done by humans analysing the rendered frames and describing the contents of the frame. In some implementations many different kinds of video frames from video streams are analysed so that a number of various kinds of videos are provided.

Therefore, the training data is generated by providing videos with and without source metadata for further screen objects such as subtitles and rendering each video. For each video frame, a descriptive label applied by an observer is also provided.

The above described method proposes two rendered video outputs of video frames that include the same primary screen objects. The difference in the renderings being that a further screen object is overlaid on the primary screen objects of each video frame when rendered with a further screen object setting turned on. Advantageously, the rendered output can be read and analysed by a computer implemented data model, such as a classifier learning engine or a computational model such as an artificial neural network, to distinguish further screen objects from primary screen objects that may have one or more features that are the same or appear similar to the further screen object. For example, in one implementation, primary screen objects in a video frame may include in-video text labels, e.g. a shop brands or text printed on a moving vehicle in the video background, and the further screen object may be timed text. As the in-video content is the same in both rendered visual outputs, the method of the first aspect can advantageously distinguish text in the in-video labels from timed text to facilitate an automatic and accurate detection of a timed text object in a rendered visual output.

In some embodiments, the source or original metadata for the plurality video frames of the input video stream comprises one or more properties associated with each primary and/or further screen object in each video frame. For example, the metadata may include a position of the screen object in a given video frame, or a time-stamp associated with the instance that the screen object is rendered, or dimensions such as the height and width of the screen object, or a duration of time for which the screen object is rendered etc. This advantageously ensures that the machine/computer readable metadata includes enough information defining how and when each screen object is rendered, thereby making detection of and/or validation of a render of the further screen object easier and accurate in a data model or processor.

In some embodiments, a media device for testing the rendering of one or more video frames is disclosed. The media device may be a set top box or the like comprising a receiver for obtaining a video stream that comprises a plurality of video frames, a player comprising one or more processors for preparing and/or rendering the obtained video stream and a display communicatively coupled with the player for displaying the rendered video stream as a visual output. The media device is configured to implement the method of the first aspect set out above.

In a second aspect of the present disclosure, a method of training a data model for detecting screen objects in one or more video frames rendered at or using a media device is disclosed. In an example implementation, the data model comprises a data structure that may be provided in a memory area of a computing device. The data structure may in some implementations be based on an artificial neural network configured to receive, analyse, characterise and store data such as video frames i.e. pixels and images contents, or metadata associated with a plurality of screen objects from a plurality of video frames. The method comprises initialising a data model for obtaining and storing data associated with a plurality of video frames and obtaining as a first input, a plurality of rendered video frames. In some embodiments, the rendered frames of the first input may be video frames rendered at the media player of the first aspect. As a second input, data items corresponding to each of the rendered frames of the first input is provided. In some implementations, the data items may be descriptive labels, each for a given rendered frame. For example, as with the first aspect the data items may be obtained by crowd sourcing by human observers or from a database. The corresponding data items for each frame is indicative of the presence or absence of a further screen object in the corresponding frame. The second aspect of training the data model is provided by applying each rendered frame to an input of the data model and reducing an error between an output of the data model for a given frame and the corresponding data item for the given frame.

Thus, once we have the training data set, for instance, as set out in the first aspect, including a set of rendered frames, and corresponding data items for each frame labelled with descriptive labels, this set ca be used to train an ANN, such as CNN like Caffe, which is a known existing image based neural network.

In some implementations, the method of training the data model is by applying each frame to an input layer of the CNN. In the simplest case, it may be considered that for example the CNN has a neuron for each pixel, for generating the output. The output is the extracted metadata from the rendered frames in the first input generated by the data model. In some implementations, this extracted metadata will include details on the further screen object rendered. Next, the method of training the data model includes adjusting connection weights of the neurons within the data model to minimise the error or difference between the recorded output metadata and the data items, i.e. descriptive metadata in the labels in the second input.

As noted above, in the simplest case this can be an indication if a further screen object such as a subtitle is present or not. The output of the data model may a flag or setting or metadata that indicates the presence or absence of a further screen object. This output is in some embodiments referred to as extracted metadata, as it related to computer/ machine readable data relating to one or more screen objects that are rendered in a video output. In some embodiments, the exacted metadata maybe in a binary output form, i.e. a flag or setting, where "1" or similar indicates the presence of a further screen object such as a subtitle, and a "0" or similar indicates the absence of a further screen object.

In some embodiments, the data model is an artificial neural network (ANN), such as a convolutional neural network (CNN), that receives and analyses images i.e. the screen objects on in a video frame, and outputs a flag or a result indicating the presence of a further screen object such as a subtitle. This can be for example extracted metadata explaining what the further screen object is, i.e. a subtitle superimposed on other primary screen objects, or an extension in a frame on which there is zero primary screen object information, etc. The extracted metadata is therefore the output of the data model.

In some implementations, a classification and or clustering algorithm may be used to train the data model for identifying one or more specific characteristics of the further screen objects in the video frames of the first input.

Advantageously, training the data model with a training data set as set out in the first aspect, that includes properties of the primary screen objects in the input video frame with and without the further screen objects of the same video frames before rendering enables the data model to accurately detect such properties subsequent or other video streams when generating the extracted metadata for such subsequent or other streams.

In some embodiments, the method of training the data model comprises detecting the presence of one or more specific or defined characteristics in the video frames of the first input. Advantageously, this enables accurate identification of rendered screen objects that include the one or more specific characteristics to better differentiate from rendered screen objects that do not include them. In some implementations, the method comprises providing a binary output identifier to indicate the presence or absence of a further screen object in the rendered video frame, based on the outcome of detecting one or more specific characteristics.

In a third aspect of the present disclosure, a method of testing video data being rendered at or using a media device is disclosed. The method of testing according to the third aspect comprises receiving at a media device a plurality of video frames to be rendered, each frame comprising one or more primary screen objects and at least one further screen object. The method of testing comprises rendering the received frames at or using the media device wherein the at least one further screen object is superimposed on the one or more primary screen objects of a given frame during rendering. The plurality of frames is rendered in accordance with source or original metadata, including machine readable instructions for a media player or the like to render primary and/or further screen objects from a source of the plurality of video frames.

The rendered frames are then provided to a data model, said data model being trained to identify a further screen object rendered in the video frame. Metadata is then extracted from the rendered video frames by the data model. As mentioned in relation to the second aspect, in some embodiments the extracted metadata comprises one or more properties associated with at least a further screen object rendered for a given video frame. In some embodiments, the data model is one that is trained in accordance with the second aspect set out above. In further embodiments, the data model is trained with training data as set out above in relation to the first aspect.

In some implementations, the original or source metadata may also be provided to the data model from a source of the video stream that comprises the video frames provided to the media device to be rendered. In other implementations, the original metadata that is provided may include metadata relating to only the further screen object for each video frame, and in other implementations, the original metadata may relate to the primary screen objects and the further screen objects. The method of testing according to the third aspect further comprises detecting the presence or absence of a further screen object by the trained data model, wherein the output of the data model is extracted metadata indicating such presence or absence for each frame. The method of testing further includes validating a detected further screen object using the original or source metadata relating to at least the further screen object before rendering. In some implementations, the validation is carried out if the source metadata indicates that a subtitle should be generated for the rendered frame and the output or extracted metadata from the data model indicates that a subtitle has been rendered, or if the source metadata indicates that a subtitle should not be generated for the rendered frame and the output or extracted indicates that a subtitle has not been rendered Advantageously, the method according to the third aspect enables the use of computer readable data, such as metadata from an output video stream, to test if the output video stream was correctly rendered. This enables testing of an output rendering to be done automatically, rather than by manually checking if the dynamic media components for each frame are correctly rendered. As metadata is generated by a data model to identify several types of screen objects and detect the presence one or more further screen object, this process is more accurate and effective when compared to a manual or a fixed image comparison process. As the testing process is automatic, i.e. carried out by computing devices implementing the data model that can characterise, classify and/or analyse the further screen objects in a rendered video frame, the process of testing a render can be repeated as often as needed for testing dynamic contents of a video stream that is rendered for playback. Furthermore, the method can be used to accurately test a live stream of video data in real time from metadata extracted from the render of the live video frames.

In some embodiments, the method of testing comprises identifying and comparing one or more specific characteristics of a detected further screen object from a rendered video frame to one or more corresponding or related specific characteristics of the original metadata pertaining to the detected further screen object. This is for identifying the presence or absence of a variance in each specific characteristic for the detected further screen object.

Advantageously, the automatic detecting of a variance in specific characteristics enables an identification of whether the result of the automatic testing is positive or negative. The presence of a variance indicates that further screen object has not been rendered correctly. In some implementations, the further screen object is a timed text instruction and the specific characteristic is a time stamp relative to one or more primary screen objects in a given frame. Therefore, a variance indicates that the timed text is out of sync for the given video frame.

In some implementations an offset is calculated based on a detected variance. The offset advantageously indicates the extent to which the further screen object is incorrectly rendered. In some embodiments, the offset is provided as feedback to the media device for subsequent adjustments. This advantageously enables the media device to adjust a subsequent rendering of the plurality of video frames based on the offset, so that the subsequent rendering no longer includes the variance. This enables application of a correction factor to automatically ensure that the same error(s) do not reoccur when rendering the video stream.

Some specific components and embodiments are now described by way of illustration with reference to the accompanying drawings, in which like reference numerals refer to like features.

With reference to FIG. 1, a schematic implementation of a method of obtaining training data for training a data model is shown, according to a first aspect.

A video stream 102 comprising a plurality of video frames is shown, along with source or original metadata 104 associated the video stream 102. In some implementations of the first aspect, the video stream is considered to be a test video stream. The original metadata is a machine-readable representation of one or more dynamic components of the video frames in the video stream 102. The original metadata 104 provided at a source of the video stream 102 is for specifying properties dictating the output or render of the video stream 102. In some implementations, this original metadata 104 may at least include metadata for generating a subtitle for one or more video frames in the video stream 102. The video stream 102 in FIG. 1 may be considered as a test video stream, rendered samples of which are to be provided for training a data model 114.

Each video frame in the video stream 102 comprises a plurality of primary screen objects, i.e. in-video images and dynamic optical characters. A plurality of such video frames in the video stream 102 may also have a further screen object that is to be superimposed on the primary screen objects, during rendering. For the purposes of illustration and explanation of embodiments described henceforth, the further screen object is timed text, i.e. a subtitle, for a given frame, for example. However, the aspects and embodiments of the present disclosure are not to be considered in any way limited to the example of timed text. The further screen object may include other dynamic content such as a stream of preview thumbnail videos relating to the video frame being rendered, a stream of media advertisements, live commentary of an event extracted from a different source, images, flags or graphical content etc. that can be superimposed and rendered in a video frame along with the primary objects of the video frame.

In step 106, the video stream 102 is provided to a media device 108 in two input stages. In the first input stage, the media device 108 is provided with the video stream 102 without any machine-readable instructions for defining the subtitles. In a second input stage the media device is provided with the same video stream 102, but this time along with machine-readable instructions that defines the subtitles to be rendered or generated for each video frame. The machine-readable instructions provided to the media device 108 are considered to be source or original metadata 104. In some implementations, the original metadata is obtained from a source of the media stream 102 to the media device 108. The media device 108 in the illustrated embodiment is configured to render the video stream 102 with the subtitles added for each frame received in the second input stage separately, or after rendering the same video stream 102 without the subtitles of the first input stage.

In step 110a the media 108 renders video stream 102 without any subtitle instructions, i.e. no subtitle instructions are present in the original metadata 104, to create a first sample 112a comprising a set of rendered video frames. This can be considered in implementation as a playback of the video stream with subtitles turned off. Therefore, no subtitle instructions are processed for this render and the video frames with in-video dynamic content, i.e. primary screen objects, are rendered to create the first sample of video frames 112a.

In step 110b the media device 108 renders video stream 102 with the subtitle instructions to create a second sample 112b comprising a set of rendered video frames with their associated subtitles. For example, in implementation the video stream 102 can be considered as being rendered by a media device with the subtitle turned on to create a second sample 112b. In an example implementation, one video frame in the second sample is rendered per second by the media device 108.

Training data to be provided to a train a data model includes the first sample 112a and the second sample 112b. In other words, the training data set includes the test video frames rendered once with the further screen object and once without. In addition to the pairs of rendered frames, the training data set also includes a data item associated with each of the rendered test video frames. The data item includes descriptive labels for at least the further screen objects of the video frames. The descriptive label may include information that is somewhat similar to the source metadata, i.e. it provides information on how, where and when a certain screen object is rendered for the video frame. As mentioned above, the descriptive labels may be obtained from crowdsourcing, where one or more human observers assign labels to describe the screen object of a certain video frame.

Accordingly, the training data set includes video frames rendered with and without a further screen object, as well as a data item as explained above for each frame. This advantageously enables, configures or trains the data model 114 to detect the presence of one or more given screen objects in a render of any video stream based on the properties of the rendered frame and/or validate if the render of the detected screen object has been performed correctly.

The data model 114 in some embodiments is a deep learning framework, which may be an artificial neural network (ANN), such as a convolutional neural network (CNN). For example, Caffe™ is example of a CNN computational model may be used for detecting objects from a dynamic visual output or image.

ANNs, otherwise known as connectionist systems, are computing systems vaguely inspired by biological neural networks. It is known that such networks "learn" tasks by considering data samples, generally without task-specific pre-programming and without any prior knowledge about a task, and instead, evolve their own set of relevant characteristics from learning material or samples that they process. ANNs can be hardware-based (where neurons are represented by physical components) or software-based (computer models) and can use a variety of topologies, learning algorithms or functions.

In some implementations, to initialise such a data model 114, which is an ANN, to be able to detect one or more screen objects from a rendered output—one or more functions may be defined for the data model 114. For example, the defined functions can be one or more of: a function that returns a structure describing labels for list of images, and/or a function that returns a region of interest (ROI) structure that describes bounding box annotations, for subtitles for instance; and/or a function that provides a test evaluation, i.e. comparison function. The text evaluation function in some embodiments can be a binary function, where a 0 indicates no subtitles (which will be the case for the first sample 112a) and 1 indicates that a subtitle exists (which will be the case for second sample 112b).

Figure 1A:
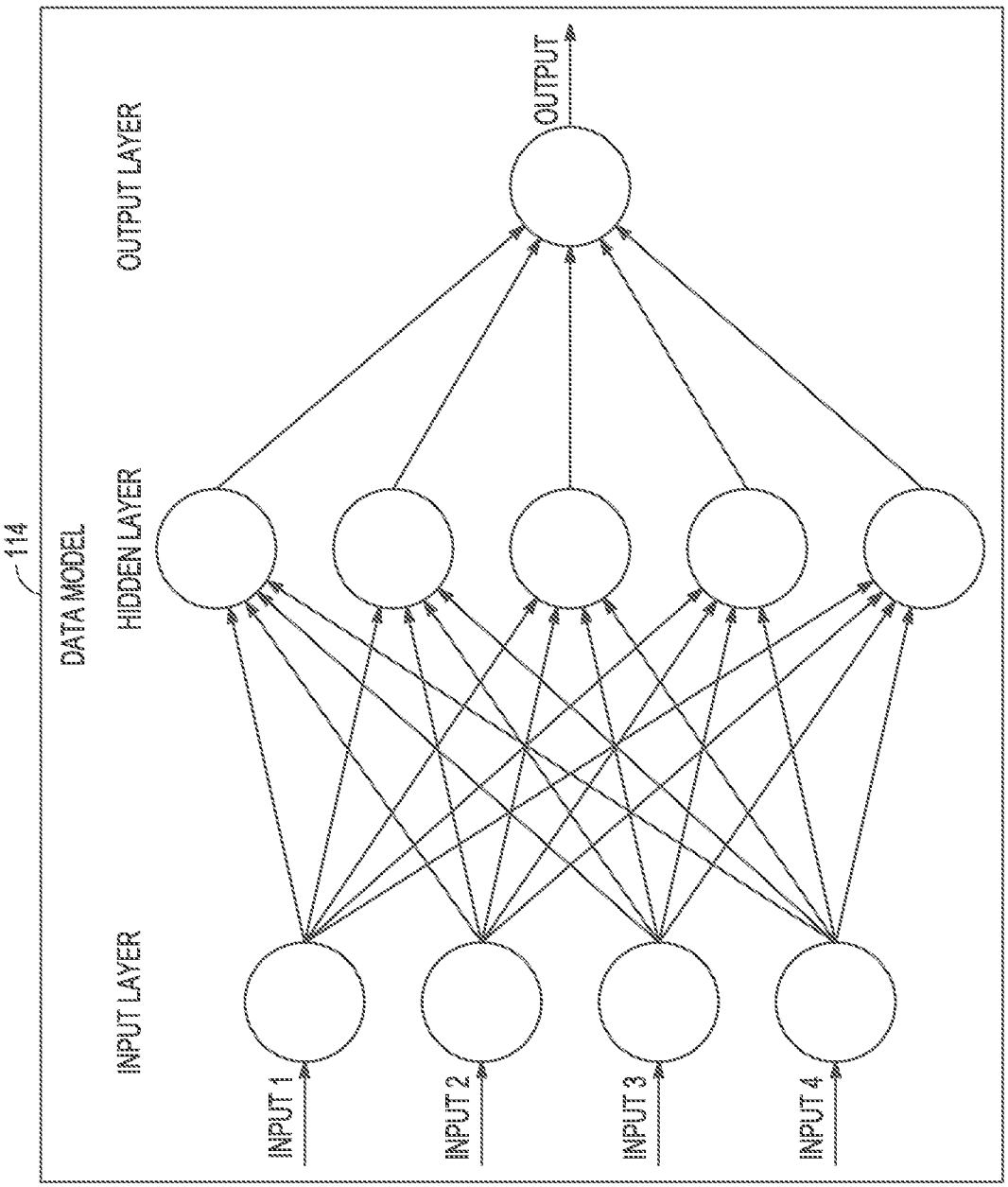
FIG. 1a is an example of a data model for use with the aspects and embodiments of the present disclosure.

An example implementation of an ANN in its simplest form that can be used as the data model 114 for aspects and embodiments of the present invention is seen in FIG. 1a. ANNs usually have at least three layers that are interconnected. The first layer, which is an input layer consists of input neurons. Those neurons are configured to send data on to the second layer, referred to as a hidden layer which implements one or more functions on data from the input layer, and which in turn is configured to send the output neurons to the third, or output layer. There may be a plurality of hidden layers in the ANN, but for simplicity a model with one such layer is shown.

The second or hidden layer in a neural network implements one or more functions. For example, the function or functions may each compute a linear transformation of the output from a previous layer or compute logical functions. For instance, considering an implementation where an input vector can be represented as x, the second or hidden layer functions as h, and the third or output layer as y, then the ANN may be understood as implementing a function $f(x)$ using the first layer and the second layer that maps from x to h, and another function $g(x)$ using the second layer and the third layer that maps from h to y.

Thus, the hidden layer is activated by $f(x)$ and the output of the network is $g(f(x))$. In some implementations of the present described embodiments, it may be understood that $f(x)$ can represent subtitle or further object detection, and $g(x)$ can represent validation of the render of the detected subtitle or further object at $f(x)$, for instance. Subtitle detection and validation is further explained below in relation to FIG. 2 below.

According to the embodiments of the present disclosure, the data model 114 detects the presence of absence of a subtitle and provides extracted metadata indicating this in an output, so that a further validation can take place to establish if the model produces the same output as the source metadata for each frame. For instance, the data model output can be represented as Extracted Metadata=>subtitle present? (Yes/no=0/1)

The training data of the first aspect, for example, is applied to the input and the weights of the neurons are adjusted so that the output 0 or 1 (or <0.5 or >0.5) depending on whether a subtitle was in the training frame or not.

Finally, further to validation, the data model may be represented as:

{extracted metadata; source metadata}=>validated (yes or no).

Figure 2:
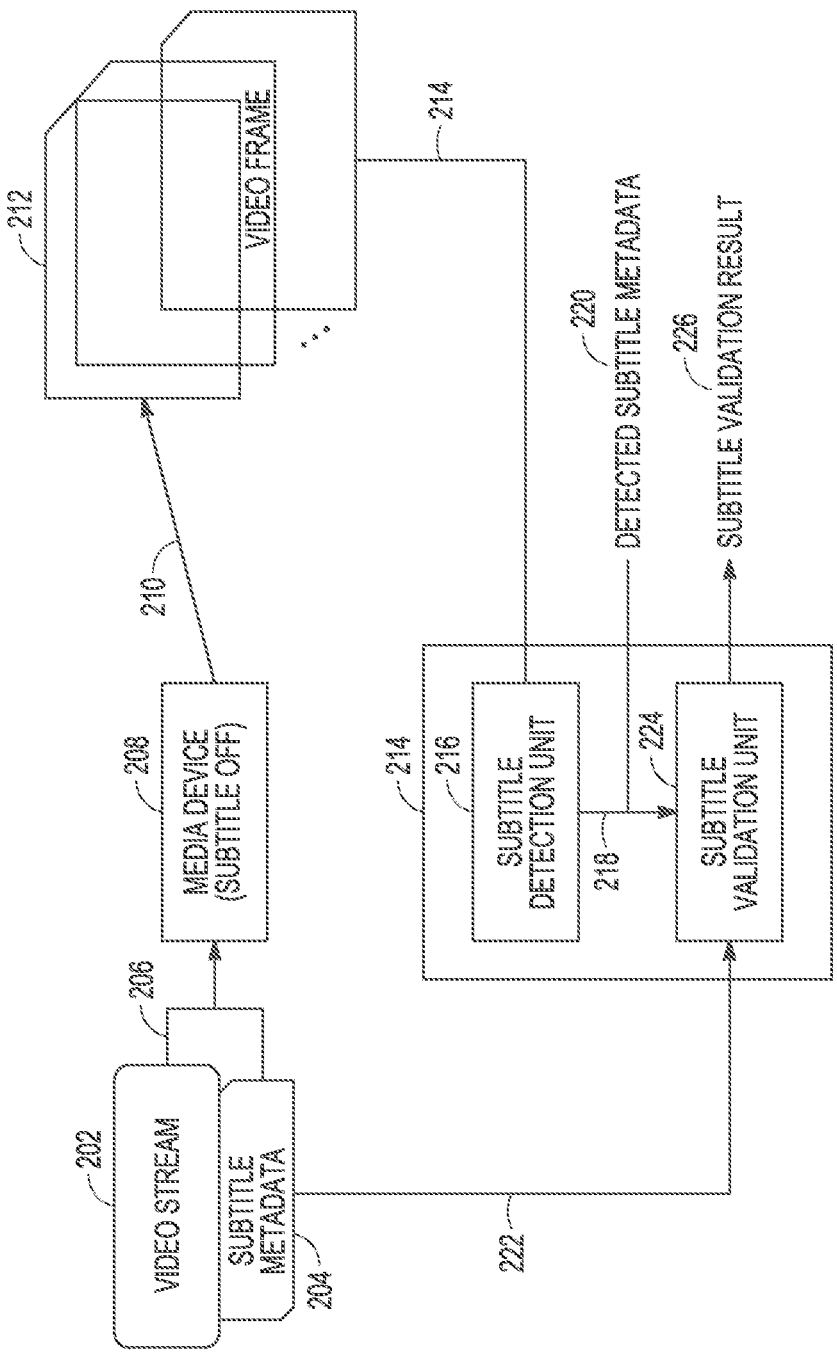
FIG. 2 is a schematic depicting a second aspect of testing video data that is rendered, where the testing is automatically carried out using a trained data model.

With reference to FIG. 2, a method of automatically testing a rendering of a video stream 202 is described, in accordance with a third aspect of the present disclosure. For the purposes of illustration, the video stream 202 is a live or real-time stream of an event such as a game or concert taking place, or a news channel broadcast live from a television studio. Like the video stream 102 in FIG. 1, The live video stream 202 comprises a plurality of video frames, each frame having a plurality of primary screen objects and at least one further screen object, which in this example is understood to be timed text, i.e. a subtitle. Original or source metadata 204 for at least the subtitle is provided at the source of the video stream 202. The original metadata 204 comprises, for example, a subtitle render instruction that includes properties defining how and when the subtitle is supposed to be displayed for a given video frame in the video stream 202, when the video stream 202 is rendered at a media device. An example of the original metadata 204 for a subtitle is seen for example in FIG. 3 and will be explained in further detailed below.

In step 206 the live video stream 202 is provided to a media device 208. The media device 208 is configured to render the input video frames from the video stream 202 for playback and display with in-video primary screen objects, along with the superimposed or overlaid further screen object, i.e. the subtitle, that is rendered using the instructions in the original metadata 204. Upon rendering in step 210, rendered video frames 212 are provided as a visual output. The media device 208 may be arranged in step 210 to render the video frames 212 by sampling one video frame of the input live video stream 202 per second.

In step 214, the rendered frames are provided to a further screen object detection module Given that the further screen object is a subtitle in the illustrated embodiments, FIG. 2 shows a subtitle detection unit 216. The subtitle detection unit 216 is included in or associated with a data model 114 as described above in the second aspect, that has been trained based on training data illustrated and explained in relation to FIG. 1, for accurately detecting and testing subtitles in a rendered video frame by generating metadata, i.e. this is extracted metadata obtained from a render of a visual output. Thus, in some implementations, as with the data model 114 in the second aspect, a binary output of '1' is produced to indicate if a subtitle is detected. Otherwise, a binary output of '0' is produced.

In some examples, when rendered video frame 212 is provided to the data model 114, which includes or is associated with the subtitle detection unit 216, the output in some embodiments may include the following, for each video frame, referred to as extracted metadata from the data model 114.

Timestamp . . .
  Is subtitle input provided (Y/N or 0/1)?
  (and optional dimensions such as)
  subtitle-top: . . .
  subtitle-left: . . .
  subtitle-width: . . .
  subtitle-height: . . .

The data model 114 detects the presence of a subtitle in the rendered frame 212. This is possible as the data model 114 has been trained using the training data set as described in relation to the first aspect including a pairs of video frames rendered with and without a further screen object, and a data item with a descriptive label for at least the further screen objects (see the first aspect in FIG. 1).

In step 218, if a subtitle is detected in a rendered video frame by the subtitle detection unit 216, then the extracted metadata output from the subtitle detection unit 216 of a detected subtitle 220, or in some implementations the extracted metadata of the video frame including the detected subtitle 220, is provided to a subtitle validation unit 224. The subtitle validation unit 224 may in some embodiments be implemented using or associated with the trained data module 114 mentioned earlier in relation to FIG. 1.

In step 222, original subtitle metadata 204 in the live video stream 202 corresponding to the rendered video frame(s) with detected subtitle metadata 220 from the subtitle detection unit 216 is then provided as a further input to the subtitle validation unit 224.

Thus, the subtitle validation unit 224 is provided with extracted metadata 220 of the detected subtitle, as well as the corresponding original metadata 204, i.e. source subtitle instruction for the same input subtitle prior to rendering. Based on a comparative analysis of both source 204 and detected metadata 220, the subtitle validation unit 224 is configured to provide an output result 226 to indicate whether the detected subtitle has been rendered correctly by the media device 208

An example implementation indicating the original metadata 204 and the extracted metadata for the detected subtitle 220 is shown in FIG. 3, to illustrate how the data model 114 implementing the subtitle validating unit 224 can be used to test if one or more subtitles were correctly rendered. The original subtitle metadata 204 in FIG. 3 indicates an instruction to render a subtitle ('First subtitle') beginning at the $2^{nd}$ second and finishing at the $5^{th}$ second. Also, the metadata 204 includes an instruction to render another one ('Second subtitle') beginning at the $10^{th}$ second and finishing at the $15^{th}$ second.

The extracted subtitle metadata for the detected subtitle 220 or the video frame including the detected subtitle 220 indicates that a subtitle is rendered between the $2^{nd}$ second and the $5^{th}$ second. So, for the First subtitle in this illustration, the validation result will be a pass, i.e. output result 226 will indicate that the subtitle was rendered correctly and as defined by the original metadata 204.

The extracted subtitle metadata for the detected subtitle 220 also indicates that another subtitle is rendered between the $13^{th}$ second and the $17^{th}$ second during the render of the video stream 202. In this case the validation results 226 will be a fail in that, the Second subtitle starts to be rendered 2 seconds later than instructed in the original metadata 204, and the Second subtitle lasts 2 seconds longer than the instruction in the original metadata 204. The validation result 226 thus also in some embodiments, indicates that the detected rendered subtitle 220 is 2 seconds out of sync during rendering by the media device 208.

Figure 4:
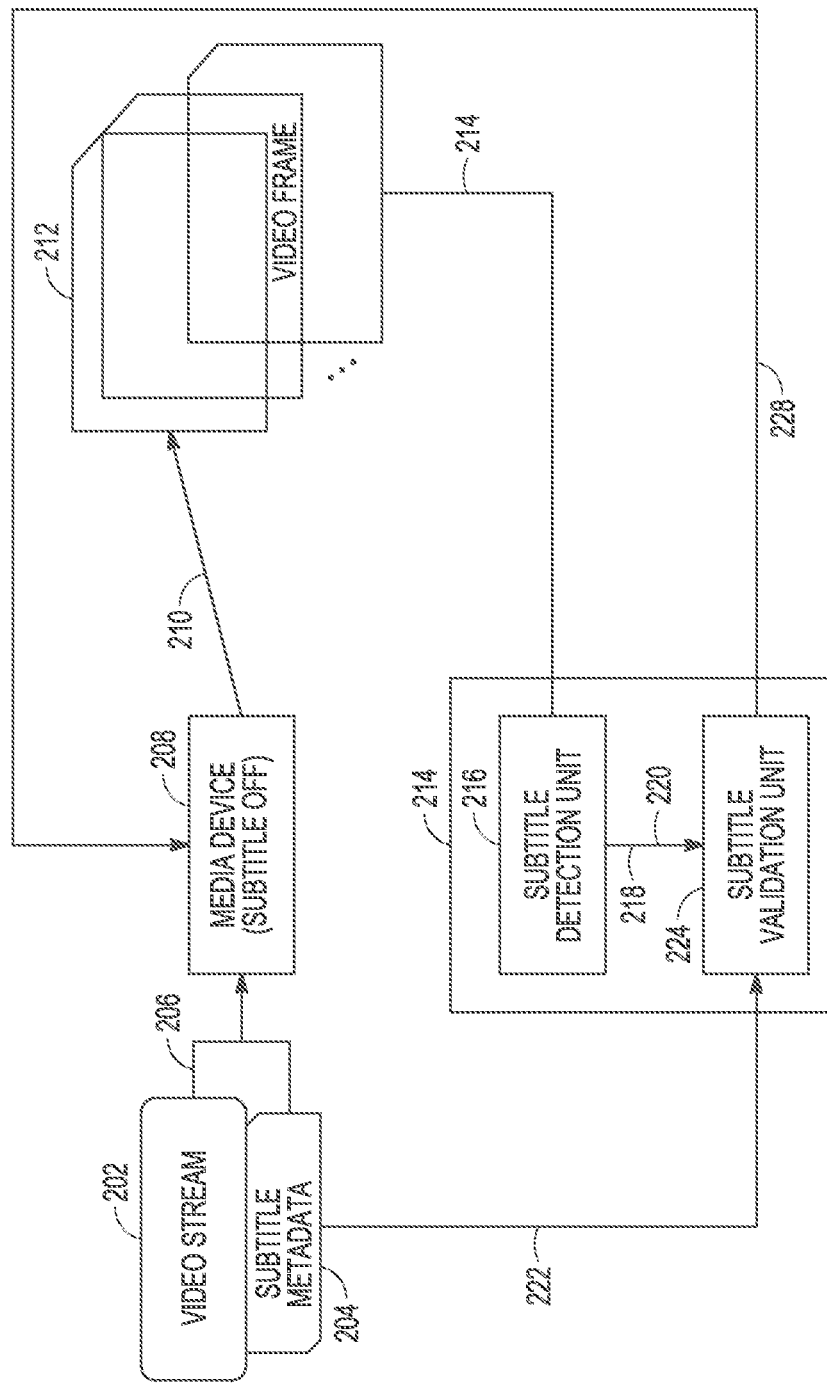
FIG. 4 is a schematic depicting a method of providing a feedback loop to a media device relating to the outcome of the testing of FIG. 3.

FIG. 4 illustrates an example embodiment for adjusting a rendering using the result of the validation unit 226 obtained in FIG. 2. FIG. 4 includes all the steps and computations explained above for FIG. 2. In addition, in step 228 of FIG. 4, an offset to indicate a variance of an incorrect or a failed subtitle test is obtained. This can be the 2 second out of sync result that is seen in FIG. 3, for example. The offset is provided as a feedback to the media device 208. One or more processors or computing devices in or associated with the media device 208 may be configured to apply this as a correction factor. The correction factor may in some implementations be provided to ensure that a future rendering or playback of the detected subtitle 220 or subtitles subsequently rendered in the video stream is no longer out of sync by 2 seconds.

Accordingly, from FIGS. 1 to 4, techniques for automatically testing rendering of visual outputs based on metadata extracted from a render of a live or real time stream of video data have been explained and illustrated. Advantageously the illustrated embodiments in FIGS. 1 to 4 enable automatic testing of visual output of a video stream of a live event and provides an efficient, automated, scalable and accurate process for testing the rendering of dynamic content.

Figure 5:
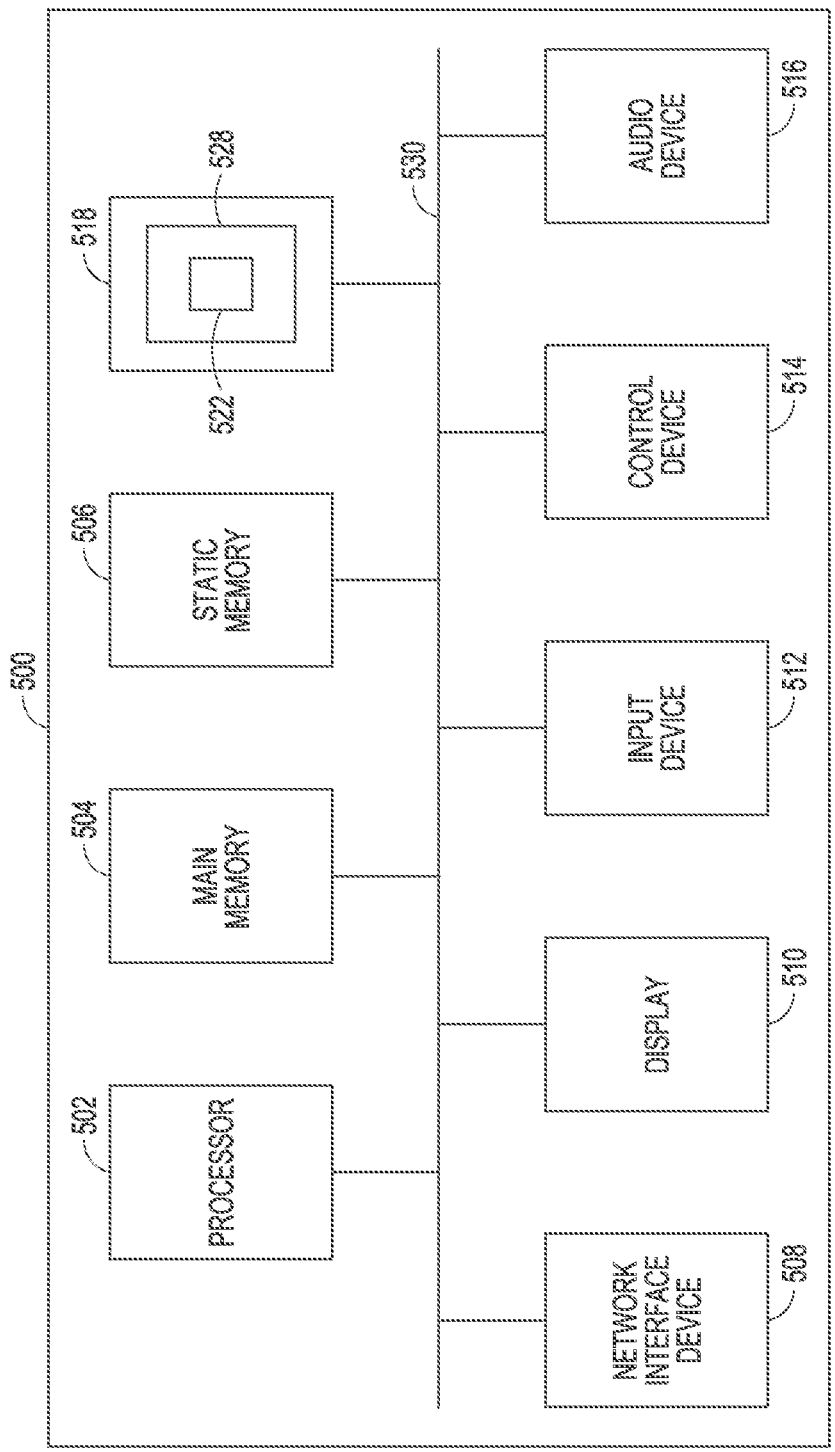
FIG. 5 is an example implementation of a media device for use in accordance with aspects of the present disclosure.

FIG. 5 illustrates a block diagram of one implementation of a computing device 500 within which a set of instructions, for causing the computing device to perform any one or more of the methodologies discussed herein, may be executed. The computing device 500 may be the media device or a device implementing the data model in the present disclosure. Similarly, the computing device 500 may also related to an example implementation of the source of the video stream. In alternative implementations, the computing device 500 may be connected (e.g., networked) to other machines in a Local Area Network (LAN), an intranet, an extranet, or the Internet. The computing device may operate in the capacity of a server or a client machine in a client-server network environment, or as a peer machine in a peer-to-peer (or distributed) network environment.

The computing device may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single computing device is illustrated, the term "computing device" shall also be taken to include any collection of machines (e.g., computers) that individually or jointly execute a set (or multiple sets) of instructions to perform any one or more of the methodologies discussed herein.

The example computing device 500 includes a processing device 502, a main memory 504 (e.g., read-only memory (ROM), flash memory, dynamic random-access memory (DRAM) such as synchronous DRAM (SDRAM) or Rambus DRAM (RDRAM), etc.), a static memory 506 (e.g., flash memory, static random-access memory (SRAM), etc.), and a secondary memory (e.g., a data storage device 518), which communicate with each other via a bus 530.

Processing device 502 represents one or more general-purpose processors such as a microprocessor, central processing unit, or the like. More particularly, the processing device 502 may be a complex instruction set computing (CISC) microprocessor, reduced instruction set computing (RISC) microprocessor, very long instruction word (VLIVV) microprocessor, processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. Processing device 502 is configured to execute the processing logic (instructions 522) for performing the operations and steps discussed herein.

The computing device 500 may further include a network interface device 508. The computing device 500 also may include a video display unit 510 (e.g., a liquid crystal display (LCD) or a cathode ray tube (CRT)), an alphanumeric input device 512 (e.g., a keyboard or touchscreen), a cursor control device 514 (e.g., a mouse or touchscreen), and an audio device 516 (e.g., a speaker).

The data storage device 518 may include one or more machine-readable storage media (or more specifically one or more non-transitory computer-readable storage media) 528 on which is stored one or more sets of instructions 522 embodying any one or more of the methodologies or functions described herein. The instructions 522 may also reside, completely or at least partially, within the main memory 504 and/or within the processing device 502 during execution thereof by the computer system 500, the main memory 504 and the processing device 502 also constituting computer-readable storage media.

The various methods described above may be implemented by a computer program. The computer program may include computer code arranged to instruct a computer to perform the functions of one or more of the various methods described above. The computer program and/or the code for performing such methods may be provided to an apparatus, such as a computer, on one or more computer readable media or, more generally, a computer program product. The computer readable media may be transitory or non-transitory. The one or more computer readable media could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as semiconductor or solid-state memory, magnetic tape, a removable computer diskette, a random-access memory (RAM), a read-only memory (ROM), a rigid magnetic disc, and an optical disk, such as a CD-ROM, CD-R/W or DVD.

In an implementation, the modules, components and other features described herein can be implemented as discrete components or integrated in the functionality of hardware components such as ASICS, FPGAs, DSPs or similar devices.

A "hardware component" is a tangible (e.g., non-transitory) physical component (e.g., a set of one or more processors) capable of performing certain operations and may be configured or arranged in a certain physical manner. A hardware component may include dedicated circuitry or logic that is permanently configured to perform certain operations. A hardware component may be or include a special-purpose processor, such as a field programmable gate array (FPGA) or an ASIC. A hardware component may also include programmable logic or circuitry that is temporarily configured by software to perform certain operations.

Accordingly, the phrase "hardware component" should be understood to encompass a tangible entity that may be physically constructed, permanently configured (e.g., hardwired), or temporarily configured (e.g., programmed) to operate in a certain manner or to perform certain operations described herein.

In addition, the modules and components can be implemented as firmware or functional circuitry within hardware devices. Further, the modules and components can be implemented in any combination of hardware devices and software components, or only in software (e.g., code stored or otherwise embodied in a machine-readable medium or in a transmission medium).

Unless specifically stated otherwise, as apparent from the following discussion, it is appreciated that throughout the description, discussions utilizing terms such as "receiving", "determining", "obtaining", "sending," "implementing,", "detecting", "extracting", "establishing", "providing", "rendering", "identifying" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

It is to be understood that the above description is intended to be illustrative, and not restrictive. Many other implementations will be apparent to those of skill in the art upon reading and understanding the above description. Although the present disclosure has been described with reference to specific example implementations, it will be recognized that the disclosure is not limited to the implementations described but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

The invention claimed is:

1. A method comprising:
   accessing, by one or more processors, a rendered plurality of video frames rendered in accordance with first metadata that specifies rendering of one or more secondary screen objects superimposed over one or more primary screen objects;
   generating, by the one or more processors and based on a trained data model, a validation result that indicates whether the rendered plurality of video frames is rendered correctly, the data model being trained based on reference data items and corresponding reference video frames, each reference data item indicating whether any secondary screen object is present in a corresponding reference video frame among the reference video frames, the generating of the validation result comprising:
      identifying a characteristic of a secondary screen object in a video frame among the rendered plurality of video frames;
      comparing the identified characteristic to a corresponding characteristic represented in the first metadata in accordance with which the rendered plurality of video frames was rendered; and
      detecting a variance in the identified characteristic based on the comparing of the identified characteristic to the corresponding characteristic; and
   providing, by the one or more processors, the validation result that indicates whether the rendered plurality of video frames is rendered correctly.

2. The method of claim 1, further comprising:
   in response to the variance being detected, calculating an offset based on the detected variance; and
   causing a media device to adjust a further rendering of the plurality of video frames based on the calculated offset.

3. The method of claim 1, wherein:
   the generating of the validation result further includes:
   inputting the rendered plurality of video frames into the data model trained to indicate, for each video frame in the rendered plurality of video frames, whether any secondary screen objects are present in that video frame, the trained data model outputting second metadata that indicates, for each inputted video frame, whether any secondary screen objects are present in that inputted video frame.

4. The method of claim 3, wherein:
   the providing of the validation result that indicates whether the rendered plurality of video frames is rendered correctly is based on a comparison of the first metadata that specifies rendering of the one or more secondary screen objects to the second metadata that indicates, for each inputted video frame, whether any secondary screen objects are present in that inputted video frame.

5. The method of claim 3, further comprising:
   providing a media device with the plurality of video frames to be rendered in accordance with the first metadata, the media device outputting the rendered plurality of video frames rendered in accordance with the first metadata; and wherein:
   the accessing of the rendered plurality of video frames includes accessing an output of the media device to which the plurality of video frames is provided.

6. The method of claim 3, wherein:
the data model is trained based on extracted metadata that indicates, for each video frame in the reference video frames, whether any secondary screen object is present in that video frame.

7. The method of claim 3, wherein:
the data model is trained based on a function that reduces errors between extracted metadata and the reference data items that each indicate whether any secondary screen objects are present in a corresponding video frame among the reference video frames, the extracted metadata indicating, for each video frame in the reference video frames, whether any secondary screen object is present in that video frame.

8. A system comprising:
one or more processors; and
a memory storing instructions that, when executed by at least one processor among the one or more processors, cause the system to perform operations comprising:
accessing a rendered plurality of video frames rendered in accordance with first metadata that specifies rendering of one or more secondary screen objects superimposed over one or more primary screen objects;
generating, based on a trained data model, a validation result that indicates whether the rendered plurality of video frames is rendered correctly, the data model being trained based on reference data items and corresponding reference video frames, each reference data item indicating whether any secondary screen object is present in a corresponding reference video frame among the reference video frames, the generating of the validation result comprising:
identifying a characteristic of a secondary screen object in a video frame among the rendered plurality of video frames;
comparing the identified characteristic to a corresponding characteristic represented in the first metadata in accordance with which the rendered plurality of video frames was rendered; and
detecting a variance in the identified characteristic based on the comparing of the identified characteristic to the corresponding characteristic; and
providing the validation result that indicates whether the rendered plurality of video frames is rendered correctly.

9. The system of claim 8, wherein the operations further comprise:
in response to the variance being detected, calculating an offset based on the detected variance; and
causing a media device to adjust a further rendering of the plurality of video frames based on the calculated offset.

10. The system of claim 8, wherein:
the generating of the validation result further includes:
inputting the rendered plurality of video frames into the data model trained to indicate, for each video frame in the rendered plurality of video frames, whether any secondary screen objects are present in that video frame, the trained data model outputting second metadata that indicates, for each inputted video frame, whether any secondary screen objects are present in that inputted video frame.

11. The system of claim 10, wherein:
the providing of the validation result that indicates whether the rendered plurality of video frames is rendered correctly is based on a comparison of the first metadata that specifies rendering of the one or more secondary screen objects to the second metadata that indicates, for each inputted video frame, whether any secondary screen objects are present in that inputted video frame.

12. The system of claim 10, wherein the operations further comprise:
providing a media device with the plurality of video frames to be rendered in accordance with the first metadata, the media device outputting the rendered plurality of video frames rendered in accordance with the first metadata; and wherein:
the accessing of the rendered plurality of video frames includes accessing an output of the media device to which the plurality of video frames is provided.

13. The system of claim 10, wherein:
the data model is trained based on extracted metadata that indicates, for each video frame in the reference video frames, whether any secondary screen object is present in that video frame.

14. The system of claim 10, wherein:
the data model is trained based on a function that reduces errors between extracted metadata and the reference data items that each indicate whether any secondary screen objects are present in a corresponding video frame among the reference video frames, the extracted metadata indicating, for each video frame in the reference video frames, whether any secondary screen object is present in that video frame.

15. A non-transitory machine-readable medium comprising instructions that, when executed by one or more processors of a machine, cause the machine to perform operations comprising:
accessing a rendered plurality of video frames rendered in accordance with first metadata that specifies rendering of one or more secondary screen objects superimposed over one or more primary screen objects;
generating, based on a trained data model, a validation result that indicates whether the rendered plurality of video frames is rendered correctly, the data model being trained based on reference data items and corresponding reference video frames, each reference data item indicating whether any secondary screen object is present in a corresponding reference video frame among the reference video frames, the generating of the validation result comprising:
identifying a characteristic of a secondary screen object in a video frame among the rendered plurality of video frames;
comparing the identified characteristic to a corresponding characteristic represented in the first metadata in accordance with which the rendered plurality of video frames was rendered; and
detecting a variance in the identified characteristic based on the comparing of the identified characteristic to the corresponding characteristic; and
providing the validation result that indicates whether the rendered plurality of video frames is rendered correctly.

16. The non-transitory machine-readable medium of claim 15, wherein the operations further comprise:
in response to the variance being detected, calculating an offset based on the detected variance; and
causing a media device to adjust a further rendering of the plurality of video frames based on the calculated offset.

17. The non-transitory machine-readable medium of claim 15, wherein:
the generating of the validation result further includes:
inputting the rendered plurality of video frames into the data model trained to indicate, for each video frame in the rendered plurality of video frames, whether any secondary screen objects are present in that video frame, the trained data model outputting second metadata that indicates, for each inputted video frame, whether any secondary screen objects are present in that inputted video frame.

18. The non-transitory machine-readable medium of claim 17, wherein:
the providing of the validation result that indicates whether the rendered plurality of video frames is rendered correctly is based on a comparison of the first metadata that specifies rendering of the one or more secondary screen objects to the second metadata that indicates, for each inputted video frame, whether any secondary screen objects are present in that inputted video frame.

19. The non-transitory machine-readable medium of claim 17, wherein:
the data model is trained based on extracted metadata that indicates, for each video frame in the reference video frames, whether any secondary screen object is present in that video frame.

20. The non-transitory machine-readable medium of claim 17, wherein:
the secondary screen object in the video frame among the rendered plurality of video frames is a timed text instruction;

the identifying of the characteristic of the timed text instruction identifies a time stamp relative to a primary screen object among the one or more primary screen objects; and the detected variance indicates that timed text corresponding to the timed text instruction is out of sync.

* * * * *